(12) United States Patent
Huang et al.

(10) Patent No.: US 12,486,557 B2
(45) Date of Patent: Dec. 2, 2025

(54) CERAMIC TOOL WITH INTEGRATED TEMPERATURE SENSING AND CUTTING FUNCTIONS, PREPARATION METHOD AND APPLICATION THEREOF

(71) Applicants: YANSHAN UNIVERSITY, Hebei (CN); SHANDONG UNIVERSITY, Shandong (CN)

(72) Inventors: Chuanzhen Huang, Qinhuangdao (CN); Jinrui Li, Qinhuangdao (CN); Zhenyu Shi, Jinan (CN); Zhen Wang, Qinhuangdao (CN); Longhua Xu, Qinhuangdao (CN); Dun Liu, Jinan (CN); Shuiquan Huang, Qinhuangdao (CN); Xiaolan Bai, Jinan (CN); Yabin Guan, Qinhuangdao (CN)

(73) Assignees: YANSHAN UNIVERSITY, Hebei (CN); SHANDONG UNIVERSITY, Shandong (CN)

( * ) Notice: Subject to any disclaimer, the term of this patent is extended or adjusted under 35 U.S.C. 154(b) by 689 days.

(21) Appl. No.: 17/900,504

(22) Filed: Aug. 31, 2022

(65) Prior Publication Data

US 2023/0364690 A1 Nov. 16, 2023

(30) Foreign Application Priority Data

May 10, 2022 (CN) .......................... 202210503915.9

(51) Int. Cl.
*C22C 29/16* (2006.01)
*C04B 35/117* (2006.01)
(Continued)

(52) U.S. Cl.
CPC ............ *C22C 29/16* (2013.01); *C04B 35/117* (2013.01); *C04B 35/645* (2013.01); *C22C 29/12* (2013.01)

(58) Field of Classification Search
None
See application file for complete search history.

(56) References Cited

U.S. PATENT DOCUMENTS

2012/0325564 A1* 12/2012 Vaughn ................ E21B 47/013
 175/428
2014/0158429 A1*  6/2014 Kader ................. E21B 47/0175
 175/40

FOREIGN PATENT DOCUMENTS

CN 100410639 C * 8/2008
CN 102584241 A * 7/2012

* cited by examiner

Primary Examiner — Seth Dumbris
(74) Attorney, Agent, or Firm — Oliff PLC

(57) ABSTRACT

A ceramic tool with integrated temperature sensing and cutting functions and preparation method and application thereof. The ceramic tool comprises a ceramic matrix, a positive thermoelectric layer and a negative thermoelectric layer being provided on two surfaces of the ceramic matrix; the ceramic matrix being formed by sintering a first matrix material, a first binding agent and a first reinforcing phase, and the thermoelectric layer being formed by sintering of a thermoelectric material; the first matrix material comprises one or more of $Al_2O_3$, $Si_3N_4$ and CBN; the first binding agent comprises one or more of Mo, Ni, Co, W and Cr; the first reinforcing phase comprises one or more of TiC, WC, SiC, MgO, $Cr_2O_3$, $TiO_2$ and $ZrO_2$; the thermoelectric material for the positive thermoelectric layer comprises $ZrB_2$ and SiC; the thermoelectric material for the negative thermoelectric layer comprises $ZrB_2$, SiC, and graphite.

9 Claims, 2 Drawing Sheets

(51) Int. Cl.
*C04B 35/645* (2006.01)
*C22C 29/12* (2006.01)

CERAMIC TOOL WITH INTEGRATED TEMPERATURE SENSING AND CUTTING FUNCTIONS, PREPARATION METHOD AND APPLICATION THEREOF

CROSS-REFERENCES TO RELATED APPLICATIONS

This application claims priority benefits to Chinese Patent Application No. 202210503915.9, filed 10 May 2022, the contents of which are incorporated herein by reference.

TECHNICAL FIELD

The present invention belongs to the field of machining technology and relates to milling and cutting, specifically to a ceramic tool with integrated temperature sensing and cutting functions, a preparation method and application thereof.

BACKGROUND

Disclosing the information in this background technical part is only for enhancement of understanding of the general background of the invention and should not necessarily be taken as an acknowledgment or any form of suggestion that this information forms the prior art already known to a person skilled in the art.

Cutting temperature is an important source of information that reflects the state of machining (e.g. milling and cutting), and the level and dynamics of cutting temperature reflect changes in cutting state of the cutting tool and parts processing quality. By monitoring the cutting temperature, the tool wears state, tool life and workpiece surface quality can be predicted, so that the machining process parameters (e.g. rotating speed of the cutting tool, etc.) can be optimized to improve the machining quality and efficiency.

Currently, cutting temperature is commonly measured by contact temperature measurement methods and non-contact temperature measurement methods. According to the inventor's research, the temperature measurement of the natural thermocouple in the contact temperature measurement and the non-contact temperature measurement method is significantly affected by the surrounding environment, and cannot accurately measure the absolute temperature of the cutting area, while using the wired thermocouple temperature measurement will damage the tool strength, and the hot contact makes the thermoelectric potential response lag, making it difficult to measure the temperature that changes too fast. The thin-film thermocouples have the problem of insufficient bonding strength between the thin film and the quartz at high temperatures, which will fall off and have poor linearity. Thus, the existing conventional methods for detecting cutting temperature have the problems of difficult temperature measurement and inaccurate measurement, which makes the machining quality and machining efficiency of milling and cutting machining to be improved.

SUMMARY

To solve the shortcomings of the prior art, the purpose of the present invention is to provide a ceramic tool with integrated temperature sensing and cutting functions, a preparation method and application thereof, the ceramic tool integrates the cutting temperature measurement function and high mechanical properties so that it can measure the cutting temperature while meeting the requirements of cutting performance, i.e., the cutting temperature can be measured without additional temperature measurement sensors during cutting, and has the advantages of simple structure, small size, high hardness, high flexural strength, and fracture toughness, easy installation, etc.

To achieve the above purpose, the technical solution of the present invention is described as follows:

In the first aspect, a ceramic tool with integrated temperature sensing and cutting functions comprises a ceramic matrix, and a positive thermoelectric layer and a negative thermoelectric layer being provided on two surfaces of the ceramic matrix, respectively; the ceramic matrix being formed by sintering a first matrix material, a first binding agent and a first reinforcing phase, and the positive thermoelectric layer and the negative thermoelectric layer are formed by sintering of a thermoelectric material, respectively:

the first matrix material comprises one or more of $Al_2O_3$, $Si_3N_4$ and CBN;
the first binding agent comprises one or more of Mo, Ni, Co, W and Cr;
the first reinforcing phase comprises one or more of TiC, WC, SiC, MgO, $Cr_2O_3$, $TiO_2$ and $ZrO_2$;
the thermoelectric material for the positive thermoelectric layer comprises $ZrB_2$ and SiC;
the thermoelectric material for the negative thermoelectric layer comprises $ZrB_2$, SiC, and graphite.

According to the present invention, the ceramic tool has a thermoelectric effect by setting a positive thermoelectric layer and negative thermoelectric layer with different thermoelectric materials on both sides of the ceramic substrate respectively, wherein when using the gradient ceramic tool with the thermoelectric effect to cut a part material, it can convert the temperature signal into the thermoelectric electromotive force signal, and then convert it into the temperature of the measured medium through an electrical instrument (secondary instrument), to measure the cutting temperature of the cutting area or cutting point in real-time, and then monitors the working condition of the gradient ceramic tool.

Meanwhile, according to the present invention, the selection of ceramic matrix materials and thermoelectric materials, as well as the interplay of materials and components, not only improves the mechanical properties of the ceramic tool, but also ensures the cutting performance of the ceramic tool while having the temperature sensing performance.

In the second aspect, a method for preparing a ceramic tool with integrated temperature sensing and cutting functions as described in the first aspect, comprising making materials for preparing each layer into powder respectively, filling and compacting the powder of each layer layer by layer in order, and finally performing a vacuum hot-pressing sintering to obtain the ceramic tool.

According to the present invention, making the material into a powder is conducive to the mixing between the components in the material, increasing the synergy between the components and improving the mechanical properties of the ceramic tool. Sintering by vacuum hot pressing not only ensures that the sintered material is denser and further improves the mechanical properties of the ceramic tool, but also avoids the oxidation of graphite and increases the temperature sensing performance of the ceramic tool.

In the third aspect, an application of a ceramic tool with integrated temperature sensing and cutting functions as described in the first aspect in the cutting process and/or milling process.

In a fourth aspect, a cutting machine tool, comprising a machine base, and a cutting tool and a temperature measuring instrument are mounted on the machine base, wherein the cutting tool is a ceramic tool with integrated temperature sensing and cutting functions as described in the first aspect, and the temperature measuring instrument being connected to thermoelectric layers on both sides of the ceramic matrix in the ceramic tool via two wires respectively.

When the ceramic tool cuts a workpiece, the cutting temperature causes an electric current to pass through the ceramic tool, resulting in a thermoelectric electromotive force. By connecting compensation wires to the temperature measuring instrument, the cutting temperature is measured in real-time, and then the tool speed and other processing parameters are adjusted according to the real-time measured cutting temperature, thus improving the machining quality and machining efficiency.

The beneficial effects of the present invention are:

According to the present invention, the cutting functions and the sensing function of the ceramic tool are integrated through the choice of materials and the setting of the tool structure, the present invention realizes the integration of the cutting functions and the sensing function of the ceramic tool, and the tool is both a cutting tool and a sensor, which has no influence on the machine tool system, has good compatibility and interchangeability, is simple to install, safe and reliable, and can be used without the need to change the existing machine tool structure and system. The ceramic tool of the present invention has a Vickers hardness of 20-22 GPa, bending strength of 800-1000 MPa, and fracture toughness of 8-10 MPa·mm$^{1/2}$.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention and do not constitute an improper limitation of the present invention.

Figure 1:
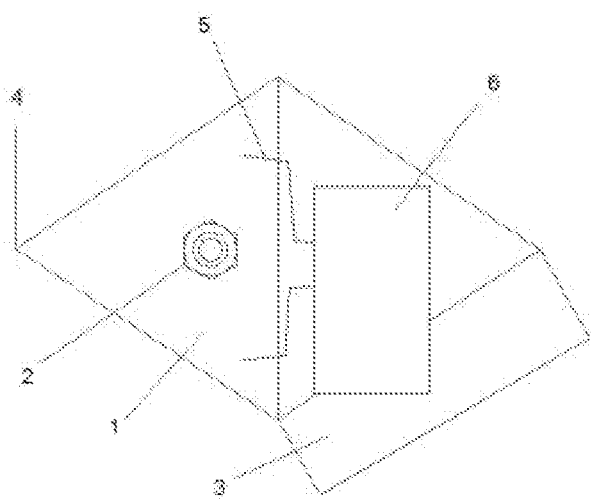
FIG. 1 is a schematic diagram of cutting temperature measurement and tool condition monitoring of a ceramic tool with integrated temperature sensing and cutting functions in an example of the present invention.

wherein, 1, ceramic tool with integrated temperature sensing and cutting functions, 2, set screw; 3, toolholder; 4, cutting point; 5, compensation wire; 6, temperature measuring instrument.

DETAILED DESCRIPTION

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific embodiments, and are not intended to limit exemplary embodiments of the present disclosure. As used herein, the singular form is also intended to include the plural form unless the context dictates otherwise. In addition, it should further be understood that the terms "comprise" and/or "comprising" used in this specification indicate that there are features, steps, operations, devices, components, and/or combinations thereof.

As described in the background, the existing conventional methods for detecting cutting temperature have the problems of difficulty in temperature measurement and inaccuracy in measurement, and to solve the above technical problems, the present invention provides a ceramic tool with integrated temperature sensing and cutting functions and preparation method and application thereof.

A ceramic tool with integrated temperature sensing and cutting functions according to a typical embodiment of the present invention, comprising a ceramic matrix, and a positive thermoelectric layer and a negative thermoelectric layer being provided on two surfaces of the ceramic matrix, respectively; the ceramic matrix being formed by sintering a first matrix material, a first binding agent and a first reinforcing phase, and the positive thermoelectric layer and the negative thermoelectric layer being formed by sintering of a thermoelectric material, respectively;

the first matrix material comprises one or more of $Al_2O_3$, $Si_3N_4$ and CBN;

the first binding agent comprises one or more of Mo, Ni, Co, W and Cr;

the first reinforcing phase comprises one or more of TiC, WC, SiC, MgO, $Cr_2O_3$, $TiO_2$ and $ZrO_2$;

the thermoelectric material for the positive thermoelectric layer comprises $ZrB_2$ and SiC;

the thermoelectric material for the negative thermoelectric layer comprises $ZrB_2$, SiC, and graphite.

According to the present invention, the selection of materials and the design of the structures not only improve the mechanical properties of the ceramic tool, but also give the ceramic tool with thermoelectric properties, thus realizing the integration of temperature sensing function and cutting functions.

In some examples of the present embodiment, a mixed layer 1 is provided between the ceramic matrix and the thermoelectric layer, and the raw material of the mixed layer 1 comprises one or more of $Al_2O_3$, $Si_3N_4$. CBN, Ni, Co, and MgO, which can increase the bonding properties between the ceramic matrix and the thermoelectric layer.

In one or more examples, a total thickness of the mixed layer 1 is 5-15% of a total thickness of the ceramic tool.

In some examples of the present embodiment, a matrix layer being provided on a surface of the thermoelectric layer, the matrix layer being formed by sintering of a second matrix material, a second binder, and a second reinforcing phase;

the second matrix material comprises one or more of $Al_2O_3$, $Si_3N_4$ and CBN;

the second binding agent comprises one or more of Mo, Ni, Co, W and Cr;

the second reinforcing phase comprises one or more of TiC, WC, SiC, MgO, $Cr_2O_3$, $TiO_2$ and $ZrO_2$, further increasing the mechanical properties of the surface of the ceramic tool.

In one or more examples, a total thickness of the ceramic matrix and the matrix layer is 50-70% of a total thickness of the ceramic tool. When there is no matrix layer, a thickness of the ceramic matrix is 50-70% of a total thickness of the ceramic tool, which can ensure the mechanical properties of the ceramic tool and the temperature sensing performance of the ceramic tool.

In one or more examples, a mixed layer 2 is provided between the matrix layer and the thermoelectric layer. The mixed layer 2 is consistent with the material selection of the mixed layer 1 described above for improving the bonding performance between the thermoelectric layer and the matrix layer.

In some examples of the present embodiment, the ceramic tool is triangular in shape, and the positive thermoelectric layer and the negative thermoelectric layer being connected at one end, which makes the detection of the temperature of the cutting point easier.

In some examples of the present embodiment, in the ceramic matrix, a mass percentage of the first binder is 0-5% and a mass percentage of the first reinforcing phase is 30-45%.

In some examples of the present embodiment, a mass percent of $ZrB_2$ in the thermoelectric layer is 60-85%.

In some examples of the present embodiment, a mass percent of the graphite in the negative thermoelectric layer is 0-20%.

Specifically, the ceramic tool with integrated temperature sensing and cutting functions has a three-layer structure consisted of a ceramic matrix and two thermoelectric layers (a positive thermoelectric layer and a negative thermoelectric layer being provided on two surfaces of the ceramic matrix). A total thickness of the two thermoelectric layers accounts for 30-50% of a total thickness of the ceramic tool, and the thermoelectric layers have a thermoelectric effect and can convert the cutting temperature signal into a thermoelectric potential signal. A thickness of the ceramic matrix accounts for 50-70% of a total thickness of the ceramic tool, and the ceramic matrix has high hardness, high wear resistance, high flexural strength, and high fracture toughness to function in cutting metals.

Specifically, the ceramic tool with integrated temperature sensing and cutting functions has a five-layer structure, comprising a ceramic matrix, two thermoelectric layers (a positive thermoelectric layer and a negative thermoelectric layer being provided on two surfaces of the ceramic matrix), and a mixed layer 1 being provided between the ceramic matrix and the positive thermoelectric layer or the negative thermoelectric layer, respectively. In this case, a total thickness of the two thermoelectric layers accounts for 25-45% of a total thickness of the ceramic tool, and the thermoelectric layers have the thermoelectric effect and are capable of converting the cutting temperature signal into the thermoelectric potential signal. A thickness of the ceramic matrix accounts for 50-70% of the total thickness of the ceramic tool, and the ceramic matrix has high hardness, high wear resistance, high flexural strength, and high fracture toughness to function in cutting metals. A total thickness of the two mixed layers 1 accounts for 5-15% of the total thickness of the ceramic tool, and the mixed layer 1 serves to bond the ceramic matrix to the thermoelectric layer.

Specifically, the ceramic tool with integrated temperature sensing and cutting functions has a five-layer structure, comprising a ceramic matrix, two thermoelectric layers (a positive thermoelectric layer and a negative thermoelectric layer being provided on two surfaces of the ceramic matrix), and a matrix layer being provided on a surface of the positive thermoelectric layer and the negative thermoelectric layer, respectively. A total thickness of the two thermoelectric layers accounts for 30-50% of a total thickness of the ceramic tool, and the thermoelectric layers have the thermoelectric effect and are capable of converting the cutting temperature signal into the thermoelectric potential signal. A total thickness of the two matrix layers and the ceramic matrix accounts for 50-70% of the total thickness of the ceramic tool, which brings high hardness, high wear resistance, high flexural strength, and high fracture toughness, serving the function of cutting part materials.

Specifically, the ceramic tool with integrated temperature sensing and cutting functions has a nine-layer structure, comprising a ceramic matrix, two thermoelectric layers (a positive thermoelectric layer and a negative thermoelectric layer being provided on two surfaces of the ceramic matrix), and a matrix layer being provided on a surface of the positive thermoelectric layer and the negative thermoelectric layer, respectively, four mixed layers, comprising a mixed layer 1 being provided between the ceramic matrix and the positive thermoelectric layer or the negative thermoelectric layer, respectively, and a mixed layer 2 being provided between the matrix layer and the positive thermoelectric layer or the negative thermoelectric layer, respectively. A total thickness of the two matrix layers and the ceramic matrix accounts for 50-70% of a total thickness of the ceramic tool, which brings high hardness, high wear resistance, high flexural strength, and high fracture toughness, serving the function of cutting part materials. A total thickness of the two thermoelectric layers accounts for 15-30% of the total thickness of the ceramic tool, and the thermoelectric layers have a thermoelectric effect and are capable of converting the cutting temperature signal into the thermoelectric potential signal. The four mixed layers with a total thickness of 5-20% of the total thickness of the ceramic tool, and the mixed layers serve to bond the ceramic matrix to the thermoelectric layer.

A method for preparing a ceramic tool with integrated temperature sensing and cutting functions as described above according to another embodiment of the present invention, comprising making materials for preparing each layer into powder respectively, filling and compacting the powder of each layer by layer in order, and finally performing a vacuum hot-pressing sintering to obtain the ceramic tool.

According to the present invention, making the material into a powder is conducive to the mixing between the components in the material, increasing the synergy between the components and improving the mechanical properties of the ceramic tool. Sintering by vacuum hot pressing not only ensures that the sintered material is denser and further improves the mechanical properties of the ceramic tool, but also avoids the oxidation of graphite and increases the temperature sensing performance of the ceramic tool.

In some examples of the present embodiment, a process of making powder comprises ball milling and drying.

In some examples of the present embodiment, a pressure intensity (pressing force) used for compacting is 4-6 MPa.

In some examples of the present embodiment, in the vacuum hot-pressing sintering, a sintering temperature is 1500-1800° C., a sintering time is 50-60 min, and a pressure intensity (pressing force) is 30-35 MPa.

According to an embodiment of the present invention, an application of the ceramic tool with integrated temperature sensing and cutting functions as described above in the cutting process and/or milling process is provided.

According to an embodiment of the present invention, provided a cutting machine tool, comprising a machine base, and a cutting tool and a temperature measuring instrument are mounted on the machine base, wherein the cutting tool is a ceramic tool with integrated temperature sensing and cutting functions as described above, and the temperature measuring instrument being connected to a thermoelectric layer on both sides of the ceramic matrix in the ceramic tool via two wires respectively.

To enable those skilled in the art to more clearly understand the technical scheme of the present invention, the technical scheme of the present invention will be described in detail below in combination with specific embodiments. It is to be understood that these examples are only for illustrating the present invention and are not intended to limit the scope of the present invention. In the following examples, the experimental procedures, where no specific conditions are indicated, are generally carried out under conventional conditions or according to the conditions recommended by the manufacturer.

In the following examples, mixing the powder of each layer of material, then performing a ball-milling treatment by taking anhydrous alcohol as a medium, after vacuum drying and sieving, filling and compacting the powder of each layer layer by layer, then performing a vacuum hot-pressing sintering after compacting to obtain a ceramic tool material with integrated temperature sensing and cutting functions; cutting and polishing the ceramic tool material with integrated temperature sensing and cutting functions to prepare the ceramic tool with integrated temperature sensing and cutting functions. The principle of cutting temperature measurement and tool condition monitoring is shown in FIG. 1. The ceramic tool with integrated temperature sensing and cutting functions 1 is fixed to a toolholder 3 by a set screw 2, when the ceramic tool with integrated temperature sensing and cutting functions 1 cuts the part material, the cutting temperature at the cutting point 4 causes an electric current to pass through the ceramic tool with integrated temperature sensing and cutting functions, resulting in a thermoelectric electromotive force. By connecting compensation wires 5 to the temperature measuring instrument 6, the cutting temperature is measured in real-time.

Example 1

Figure 2:
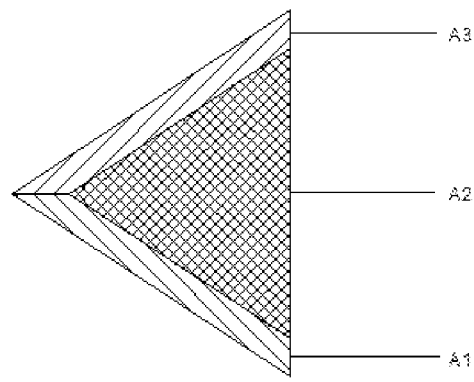
FIG. 2 is a structural diagram of a ceramic tool with integrated temperature sensing and cutting functions of example 1 of the present invention.

A structure of a ceramic tool with integrated temperature sensing and cutting functions, as shown in FIG. 2, has a three-layer structure, wherein the first layer is a thermoelectric layer made of thermoelectric materials such as $ZrB_2$ and SiC, whose thickness is 20% of a total thickness of the ceramic tool; the second layer is a ceramic matrix layer made of $Al_2O_3$-based or $Si_3Ne$-based ceramic materials, etc., whose thickness is 60% of the total thickness of the ceramic tool; the third layer is a thermoelectric layer made of thermoelectric materials such as $ZrB_2$, SiC, and graphite, whose thickness is 20% of the total thickness of the ceramic tool.

In the example, the powder materials required for the preparation of the ceramic tool with integrated temperature sensing and cutting functions are shown in Table 1, which gives the weight ratios (wt. %) of the powder components of A1 (the first layer), A2 (the second layer), and A3 (the third layer).

TABLE 1

| | Weight Ratio of Powder Component (wt. %) | | | | | | | |
|---|---|---|---|---|---|---|---|---|
| | $Al_2O_3$ | TiC | $ZrO_2$ | MgO | Ni | $ZrB_2$ | SiC | Graphite |
| A1 | — | — | — | — | — | 80 | 20 | — |
| A2 | rest | 30 | 1 | 5 | 3 | — | 5 | — |
| A3 | — | — | — | — | — | 65 | 20 | 15 |

Putting the powder materials of each layer into ball milling tanks respectively, taking hard alloy balls as milling balls and anhydrous ethanol as a medium, performing the ball milling for 48 hours, then drying a suspension obtained after the ball milling in a vacuum drying oven, sieving the powder obtained after drying with a 100-mesh sieve to obtain a sieved powder, and sealing the sieved powder for later use. Subsequently, uniformly mixing the sieved powder of each layer in the amount shown in Table 1 and filling the powder into a mold layer by layer in a order of A1/A2/A3 by controlling the thickness of each layer and each layer of the powder needs to be paved and compacted until the powder is filled. Precompaction of the powder at a pressure of 5 MPa, followed by hot-pressing sintering in a vacuum hot-pressure sintering furnace with a sintering temperature of 1650° C., a sintering time of 50 min, and a sintering pressure of 30 MPa. Cutting and polishing a ceramic blank with high density obtained after the sintering to obtain the three-layer structural ceramic tool with integrated temperature sensing and cutting functions. After sintering, a high-density ceramic blank is obtained, which is cut and polished to make a ceramic tool with a three-layer structure that integrates temperature sensing and cutting functions. The cutting force can be measured in real time by mounting the tool with a charge collection device to a toolholder.

Example 2

Figure 3:
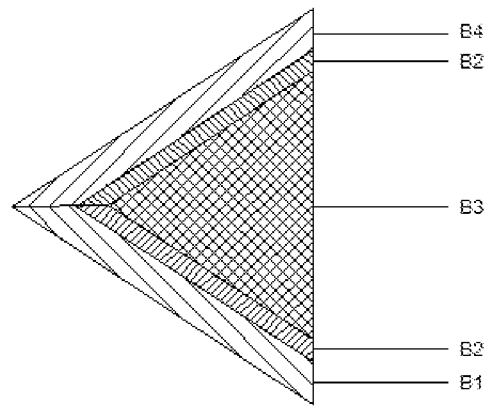
FIG. 3 is a structural diagram of the ceramic tool with integrated temperature sensing and cutting functions of example 2 of the present invention.

A structure of a ceramic tool with integrated temperature sensing and cutting functions, as shown in FIG. 3, has a five-layer structure, wherein the first layer is a thermoelectric layer made of thermoelectric materials such as $ZrB_2$ and SiC, whose thickness is 15% of a total thickness of the ceramic tool; the fifth layer is a thermoelectric layer made of thermoelectric materials such as $ZrB_2$, SiC, and graphite, whose thickness is 15% of the total thickness of the ceramic tool; the third layer is a ceramic matrix layer made of $Al_2O_3$ or $Si_3N_4$-based ceramic materials, etc., whose thickness is 50% of the total thickness of the ceramic tool; the second layer and the fourth layer are mixed layers made of various materials such as $Al_2O_3$, Ni, Co, MgO, etc., whose thickness is 10% of the total thickness of the ceramic tool.

In the example, the powder materials required for the preparation of the ceramic tool with integrated temperature sensing and cutting functions are shown in Table 2, which gives the weight ratios (wt. %) of the powder components of B1 (the first layer). B2 (the second layer or the fourth layer). B3 (the third layer) and B4 (the fifth layer).

TABLE 2

| | Weight Ratio of Powder Components (wt. %) | | | | | | | |
|---|---|---|---|---|---|---|---|---|
| | $Al_2O_3$ | TiC | MgO | Ni | Co | $ZrB_2$ | SiC | Graphite |
| B1 | — | — | — | — | — | 80 | 20 | — |
| B2 | 35 | 5 | 5 | rest | 15 | — | — | — |
| B3 | rest | 30 | 5 | 2 | — | — | — | — |
| B4 | — | — | — | — | — | 65 | 20 | 15 |

TABLE 2-continued

| Weight Ratio of Powder Components (wt. %) | | | | | | | |
|---|---|---|---|---|---|---|---|
| $Al_2O_3$ | TiC | MgO | Ni | Co | $ZrB_2$ | SiC | Graphite |

Putting the powder materials of each layer into ball milling tanks respectively, taking hard alloy balls as milling balls and anhydrous ethanol as a medium, performing the ball milling for 48 hours, then drying a suspension obtained after the ball milling in a vacuum drying oven, sieving the powder obtained after drying with a 100-mesh sieve to obtain a sieved powder, and sealing the sieved powder for later use. Subsequently, uniformly mixing the sieved powder of each layer in the amount shown in Table 2 and filling the powder into a mold layer by layer in a order of B1/B2/B3/B2/B4 by controlling the thickness of each layer and each layer of the powder needs to be paved and compacted until the powder is filled. Precompaction of the powder at a pressure of 5 MPa, followed by hot-pressing sintering in a vacuum hot-pressure sintering furnace with a sintering temperature of 1650° C., a sintering time of 50 min, and a sintering pressure of 30 MPa. Cutting and polishing a ceramic blank with high density obtained after the sintering to obtain the three-layer structural ceramic tool with integrated temperature sensing and cutting functions. After sintering, a high-density ceramic blank is obtained, which is cut and polished to make a ceramic tool with a three-layer structure that integrates temperature sensing and cutting functions. The cutting force can be measured in real time by mounting the tool with a charge collection device to a toolholder.

Example 3

Figure 4:
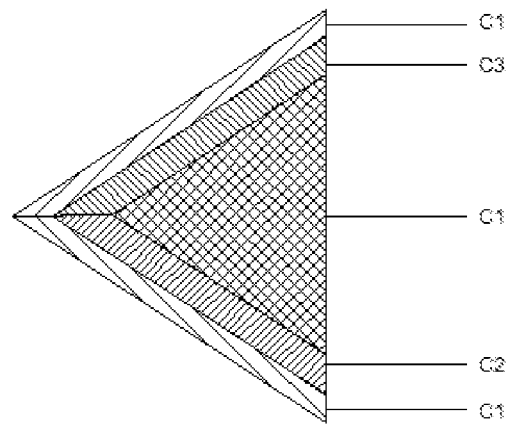
FIG. 4 is a structural diagram of a ceramic tool with integrated temperature sensing and cutting functions of example 3 of the present invention.

A structure of a ceramic tool with integrated temperature sensing and cutting functions, as shown in FIG. 4, has a five-layer structure, wherein the first layer, the third layer and the fifth layer are ceramic matrix layers made of $Al_2O_3$-based or $Si_3N_4$-based ceramic materials, etc., whose thickness is 50% of the total thickness of the ceramic tool; the second layer is a thermoelectric layer made of thermoelectric materials such as $ZrB_2$ and SiC, whose thickness is 20% of the total thickness of the ceramic tool; the fourth layer is a thermoelectric layer made of thermoelectric materials such as $ZrB_2$, SiC, and graphite, whose thickness is 20% of the total thickness of the ceramic tool.

In the present example, the powder materials required for the preparation of the ceramic tool with integrated temperature sensing and cutting functions are shown in Table 3, which gives the weight ratios (wt. %) of the powder components of C1 (the first layer, the third layer and the fifth layer), C2 (the second layer), and C3 (the fourth layer).

TABLE 3

| Weight Ratio of Powder Components (wt. %) | | | | | | | |
|---|---|---|---|---|---|---|---|
| | $Al_2O_3$ | TiC | $ZrO_2$ | Ni | Co | $ZrB_2$ | SiC | Graphite |
| C1 | rest | 30 | 1 | 2 | 1 | — | 5 | — |
| C2 | — | — | — | — | — | 80 | 20 | — |
| C3 | 20 | — | — | — | — | 65 | 20 | 15 |

Putting the powder materials of each layer into ball milling tanks respectively, taking hard alloy balls as milling balls and anhydrous ethanol as a medium, performing the ball milling for 48 hours, then drying a suspension obtained after the ball milling in a vacuum drying oven, sieving the powder obtained after drying with a 100-mesh sieve to obtain a sieved powder, and sealing the sieved powder for later use. Subsequently, uniformly mixing the sieved powder of each layer in the amount shown in Table 3 and filling the powder into a mold layer by layer in a order of C1/C2/C1/C3/C1 by controlling the thickness of each layer and each layer of the powder needs to be paved and compacted until the powder is filled. Precompaction of the powder at a pressure of 5 MPa, followed by hot-pressing sintering in a vacuum hot-pressure sintering furnace with a sintering temperature of 1650° C., a sintering time of 50 min, and a sintering pressure of 30 MPa. Cutting and polishing a ceramic blank with high density obtained after the sintering to obtain the three-layer structural ceramic tool with integrated temperature sensing and cutting functions. After sintering, a high-density ceramic blank is obtained, which is cut and polished to make a ceramic tool with a three-layer structure that integrates temperature sensing and cutting functions. The cutting force can be measured in real time by mounting the tool with a charge collection device to a toolholder.

Example 4

Figure 5:
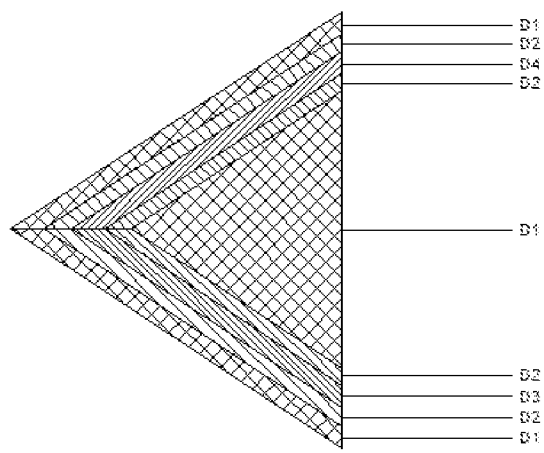
FIG. 5 is a structural diagram of a ceramic tool with integrated temperature sensing and cutting functions of example 4 of the present invention.

A structure of a ceramic tool with integrated temperature sensing and cutting functions, as shown in FIG. 5, has a nine-layer structure, wherein the first layer, the fifth layer and the ninth layer are ceramic matrix layers made of $Al_2O_3$-based or $Si_3N_4$-based ceramic materials, etc., whose thickness is 50% of a total thickness of the ceramic tool; the second layer, the fourth layer, the sixth layer, and the eighth layer are mixed layers made of various materials such as $Al_2O_3$, Ni, Co, MgO, etc., whose thickness is 16% of the total thickness of the ceramic tool; the third layer is a thermoelectric layer made of thermoelectric materials such as $ZrB_2$ and SiC, whose thickness is 17% of the total thickness of the ceramic tool, the seventh layer is a thermoelectric layer made of thermoelectric materials such as $ZrB_2$, SiC, and graphite, whose thickness is 17% of the total thickness of the ceramic tool.

In the present example, the powder materials required for the preparation of the ceramic tool with integrated temperature sensing and cutting functions are shown in Table 4, which gives the weight ratios (wt. %) of the powder components of D1 (the first layer, the fifth layer, and the ninth layer), D2 (the second layer, the fourth layer, the sixth layer, and the eighth layer), D3 (the third layer) and D4 (the seventh layer).

TABLE 4

| Weight Ratio of Powder Components (wt. %) | | | | | | | | |
|---|---|---|---|---|---|---|---|---|
| | $Al_2O_3$ | TiC | $ZrO_2$ | Ni | Co | $ZrB_2$ | SiC | Graphite |
| D1 | rest | 30 | 1 | — | — | — | 5 | — |
| D2 | 40 | 5 | — | rest | 10 | — | — | — |
| D3 | | | | | | 80 | 20 | — |
| D4 | | | | | | 65 | 20 | 15 |

Putting the powder materials of each layer into ball milling tanks respectively, taking hard alloy balls as milling balls and anhydrous ethanol as a medium, performing the ball milling for 48 hours, then drying a suspension obtained after the ball milling in a vacuum drying oven, sieving the powder obtained after drying with a 100-mesh sieve to obtain a sieved powder, and sealing the sieved powder for later use. Subsequently, uniformly mixing the sieved powder of each layer in the amount shown in Table 4 and filling the powder into a mold layer by layer in a order of D1/D2/D3/D2/D1/D2/D4/D2/D1 by controlling the thickness of each layer and each layer of the powder needs to be paved and compacted until the powder is filled. Precompaction of the powder at a pressure of 5 MPa, followed by hot-pressing sintering in a vacuum hot-pressure sintering furnace with a sintering temperature of 1650° C., a sintering time of 50 min, and a sintering pressure of 30 MPa. Cutting and polishing a ceramic blank with high density obtained after the sintering to obtain the three-layer structural ceramic tool with integrated temperature sensing and cutting functions. After sintering, a high-density ceramic blank is obtained, which is cut and polished to make a ceramic tool with a three-layer structure that integrates temperature sensing and cutting functions. The cutting force can be measured in real time by mounting the tool with a charge collection device to a toolholder.

The foregoing descriptions are merely preferred examples of the present invention but are not intended to limit the present invention. A person skilled in the art may make various alterations and variations to the present invention. Any modification, equivalent replacement, or improvement made within the spirit and principle of the present invention shall fall within the protection scope of the present invention.

What is claimed is:

1. A ceramic tool with integrated temperature sensing and cutting functions, comprising a ceramic matrix, wherein
    at least one thermoelectric layer is provided on first and second surfaces of the ceramic matrix, wherein
    the at least one thermoelectric layer provided on the first surface is a positive thermoelectric layer; and the at least one thermoelectric layer provided on the second surface is a negative thermoelectric layer;
    the ceramic matrix is formed by sintering a first matrix material, a first binding agent and a first reinforcing phase, and
    the thermoelectric layers on the first and second surface are formed by sintering of a thermoelectric material; wherein
        the first matrix material comprises one or more of $Al_2O_3$, $Si_3N_4$ and CBN;
        the first binding agent comprises one or more of Mo, Ni, Co, W and Cr;
        the first reinforcing phase comprises one or more of TiC, WC, SiC, MgO, $Cr_2O_3$, $TiO_2$ and $ZrO_2$;
        the thermoelectric material for the positive thermoelectric layer comprises $ZrB_2$ and SiC; and
        the thermoelectric material for the negative thermoelectric layer comprises $ZrB_2$, SiC, and graphite.

2. The ceramic tool as claimed in claim 1, wherein a mixed layer is provided between the ceramic matrix and each of the thermoelectric layers, and a raw material of the mixed layer comprises one or more of $Al_2O_3$, $Si_3N_4$, CBN, Ni, Co and MgO.

3. The ceramic tool as claimed in claim 1, wherein
    a matrix layer is provided on a surface of each of the thermoelectric layers,
    the matrix layer is formed by sintering of a second matrix material, a second binder, and a second reinforcing phase; wherein
        the second matrix material comprises one or more of $Al_2O_3$, $Si_3N_4$ and CBN;
        the second binding agent comprises one or more of Mo, Ni, Co, W and Cr; and
        the second reinforcing phase comprises one or more of TiC, WC, SiC, MgO, $Cr_2O_3$, $TiO_2$ and $ZrO_2$.

4. The ceramic tool as claimed in claim 3, wherein
    a total thickness of the ceramic matrix and the matrix layer is 50-70% of a total thickness of the ceramic tool; or,
    a mixed layer is provided between the matrix layer and each of the thermoelectric layers.

5. The ceramic tool as claimed in claim 1, wherein the ceramic tool is triangular in shape, and the positive thermoelectric layer and the negative thermoelectric layer being connected at one end.

6. The ceramic tool as claimed in claim 1, wherein in the ceramic matrix, a mass percentage of the first binding agent is 0-5% and a mass percentage of the first reinforcing phase is 30-45%;
    or, a mass percent of $ZrB_2$ in the at least one thermoelectric layer is 60-85%;
    or, a mass percent of the graphite in the at least one thermoelectric layer is 0-20%.

7. A method of preparing the ceramic tool with integrated temperature sensing and cutting functions as claimed in claim 1, comprising making materials for preparing each layer into powder respectively, filling and compacting the powder of each layer one by one in order, and performing a vacuum hot-pressing sintering to obtain a ceramic tool.

8. The preparation method as claimed in claim 7, wherein
    a process of making powder comprises ball milling and drying; or,
    a pressure intensity used for compacting is 4-6 MPa; or,
    in the vacuum hot-pressing sintering, a sintering temperature is 1500-1800° C., a sintering time is 50-60 min, and a pressure intensity (pressing force) is 30-35 MPa.

9. A cutting machine tool, comprising a machine base, wherein
    a temperature measuring instrument is mounted on the machine base,
    the ceramic tool with integrated temperature sensing and cutting functions as claimed in claim 1 is mounted on the machine base, and
    the temperature measuring instrument being connected to the positive and negative thermoelectric layers on both surfaces of the ceramic matrix in the ceramic tool via two wires respectively.

* * * * *